US008666185B2

(12) United States Patent
Dauw et al.

(10) Patent No.: US 8,666,185 B2
(45) Date of Patent: *Mar. 4, 2014

(54) COMPRESSION OF DIGITAL IMAGES OF SCANNED DOCUMENTS

(75) Inventors: Michel Dauw, Machelen (BE); Pierre Demuelenaere, Court-Saint-Etienne (BE)

(73) Assignee: I.R.I.S., Mont-Saint-Guibert (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,909

(22) Filed: Nov. 17, 2011

(65) Prior Publication Data

US 2012/0063686 A1    Mar. 15, 2012

Related U.S. Application Data

(63) Continuation of application No. 11/744,542, filed on May 4, 2007, now Pat. No. 8,068,684.

(51) Int. Cl.
*G06K 9/46* (2006.01)
*G06K 9/34* (2006.01)
*G06K 9/36* (2006.01)
*H04N 1/41* (2006.01)

(52) U.S. Cl.
USPC ........... 382/243; 382/164; 382/166; 382/176; 382/174; 382/232; 382/237; 382/257; 382/282; 382/290; 382/292; 358/426.01; 358/464

(58) Field of Classification Search
USPC ......... 382/243, 164, 166, 176, 177, 232, 237, 382/257, 282, 290, 292; 358/426.01, 464
See application file for complete search history.

(56) References Cited

U.S. PATENT DOCUMENTS

| 5,751,855 A | 5/1998 | Saund |
| 5,778,092 A * | 7/1998 | MacLeod et al. ............. 382/176 |

(Continued)

FOREIGN PATENT DOCUMENTS

| JP | 2002-077633 A | 3/2002 |
| JP | 2003-087558 A | 3/2003 |

(Continued)

OTHER PUBLICATIONS

Okun et al., "Robust Text Detection from Binarized Document Images", ICPR '02 Proceedings of the 16th International Conference on Pattern Recognition. 3. (2002): Print.

(Continued)

*Primary Examiner* — Michael A Newman
(74) *Attorney, Agent, or Firm* — Browdy and Neimark, PLLC

(57) ABSTRACT

A first aspect of the invention relates to a method for creating a binary mask image from an a inputted digital image of a scanned document, comprising the steps of creating a binarized image by binarizing the inputted digital image, detecting first text regions representing light text on a dark background, and inverting the first text regions, such that the inverted first text regions are interpretable in the same way as dark text on a light background. A second aspect of the invention relates to a method for comparing in a binary image a first pixel blob with a second pixel blob to determine whether they represent matching symbols, comprising the steps of detecting a line in one blob not present in the other and/or determining if one of the blobs represents an italicized symbol where the other does not.

13 Claims, 21 Drawing Sheets

(56) References Cited

U.S. PATENT DOCUMENTS

| | | |
|---|---|---|
| 5,818,965 A | 10/1998 | Davies |
| 5,835,638 A | 11/1998 | Rucklidge et al. |
| 6,094,484 A | 7/2000 | Hall, Jr. |
| 6,563,949 B1 * | 5/2003 | Takebe ............ 382/190 |
| 6,690,826 B2 | 2/2004 | Slavin |
| 6,701,008 B1 | 3/2004 | Suino |
| 6,731,800 B1 | 5/2004 | Barthel et al. |
| 6,748,115 B1 | 6/2004 | Gross |
| 6,941,011 B2 | 9/2005 | Roylance et al. |
| 6,941,014 B2 | 9/2005 | Lin et al. |
| 7,298,900 B2 | 11/2007 | Kanatsu |
| 7,403,661 B2 | 7/2008 | Curry et al. |
| 7,447,365 B2 | 11/2008 | Ferlitsch |
| 8,068,684 B2 * | 11/2011 | Dauw et al. ............ 382/243 |
| 2003/0133612 A1 | 7/2003 | Fan |
| 2004/0074973 A1 * | 4/2004 | Schneck et al. ............ 235/488 |
| 2004/0096102 A1 | 5/2004 | Handley |
| 2005/0180645 A1 | 8/2005 | Hasegawa et al. |
| 2005/0180647 A1 | 8/2005 | Curry et al. |

FOREIGN PATENT DOCUMENTS

| | | |
|---|---|---|
| JP | 2005-071088 A | 3/2005 |
| JP | 2006-197178 A | 7/2006 |
| JP | 2007-019673 A | 1/2007 |

OTHER PUBLICATIONS

Japanese Office Action of Application No. 2004-303103 dated Jan. 29, 2013.

* cited by examiner

421

422

423

431

432

437
« CROSS »

441

442

443
« AND »

Input Color image 1
(300 dpi)

Binarized image 123
(300 dpi)

Binary Mask Image 6
(300 dpi)

Fig. 13

Background Image 5
(100 dpi)

Foreground Image 7
(50 dpi)

Reconstructed image 12
(300 dpi)

Binarized image 123 without the vertical black line

Binarized Image 123 with only large black blobs, inverted

Binarized image 123 without large black blobs

Inverted image without large black blobs

Binarized image 123 without large black blobs and in which white blobs are inverted

COMPRESSION OF DIGITAL IMAGES OF SCANNED DOCUMENTS

TECHNICAL FIELD

The present invention relates to methods, algorithms and computer readable program products for compressing inputted digital images of scanned documents.

BACKGROUND ART

ITU-T have defined in their Recommendation T.44 the Mixed Raster Content (MRC) model. By using this model, it would be possible to compress color and grayscale document images with a high compression rate, a good legibility of the text and a good rendering of the pictures. The MRC Model divides the document image into 3 layers: the binary mask layer, the foreground layer and the background layer. The mask layer is a binary image, the background and foreground layers are color (or grayscale) images. An ON pixel in the binary mask layer indicates that, when decompressing, the color (or grayscale) has to be taken from the foreground layer. An OFF pixel in the binary mask layer indicates that, when decompressing, the color (or grayscale) has to be taken from the background layer. However, ITU-T T.44 does not specify the method of the division into layers.

From U.S. Pat. No. 5,778,092 a first technique for compressing a color or gray scale pixel map representing a document is known, corresponding to the MRC model. The pixel map is decomposed into a three-plane representation comprising a reduced-resolution foreground plane, a reduced-resolution background plane, and a high-resolution binary selector plane. The foreground plane contains the color or gray scale information of foreground items such as text and graphic elements. The background plane contains the color or gray scale information for the "background" of the page and the continuous tone pictures that are contained on the page. The selector plane stores information for selecting from either the foreground plane or background plane during decompression. Each of the respective planes is compressed using a compression technique suitable for the corresponding data type.

From U.S. Pat. No. 6,731,800 another technique is known for compressing scanned, colored and gray-scale documents, in which the digital image of the scanned document is divided into three image planes, namely a foreground image, a background image and a binary mask image. The mask image describes which areas of the document belong to the foreground and which to the background. In order to generate the mask image, a locally variable threshold value image is generated from the defined reduced original document with an adaptive threshold method, and brought back once again to the size of the original document. With this technique, also inverse text (light text on a dark background) can be detected. The inverse text is detected by the concept of "holes". A "hole" is a foreground region or blob which touches a different foreground region which has already been entered. This method requires a lot of memory since all blobs have to be tracked and is time consuming since it has to be checked if the blobs are touching each other. In addition both the "black" blobs and the "white" blobs have to be recorded.

From U.S. Pat. No. 6,748,115 an image compression technique is known, which employs selecting a gray level threshold value for converting a gray level digital image input into a bi-level input which minimizes weak connectivity, wherein weak connectivity comprises a checkerboard pattern found in a 2×2 array or neighborhood of pixels. The threshold value for the conversion is determined by traversing the array of pixels comprising the document in a single path, examining successive 2×2 neighborhoods and incrementing a plus register for the gray level value which a checkerboard pattern first appears and incrementing a minus register for the gray level value at which the checkerboard pattern no longer exists.

These image compression techniques however have the disadvantage that the achieved compression rates are insufficient. Often also the quality of the reconstructed image, e.g. the legibility of the text or the rendering of the pictures is affected by the compression technique.

From U.S. Pat. No. 5,835,638 a method and apparatus are known for comparing symbols extracted from binary images of text for classifying into equivalence classes. A Hausdorff-like method is used for comparing symbols for similarity. When a symbol contained in a bitmap A is compared to a symbol contained in a bitmap B, it is determined whether or not the symbol in bitmap B fits within a tolerance into a dilated representation of the symbol in bitmap A with no excessive density of errors and whether the symbol in bitmap A fits within a tolerance into a dilated representation of the symbol in bitmap B with no excessive density of errors. If both tests are passed, an error density check is performed to determine a match.

This known symbol comparison method has the disadvantage that in many cases a match may be returned where in fact a mismatch occurs.

DISCLOSURE OF THE INVENTION

It is an aim of the present invention to provide an image compression technique for scanned documents with which a higher compression rate can be achieved without affecting the quality of the reconstructed image.

In particular, it is an aim of the invention to provide an image compression technique which does substantially not compromise on the legibility of the text or the rendering of the pictures.

It is another aim of the invention to provide an image compression technique which is very flexible in adjusting the trade-off between compactness and quality.

It is another aim of the invention to provide an image compression technique suitable for any type of documents, e.g. documents which may contain text elements of different colors and intensities and/or documents containing text elements placed on backgrounds of different colors and intensities or on non-uniform backgrounds such as a watermark or a photo.

In particular, it is an aim of the invention to provide an image compression technique suitable for documents containing light text on a dark background.

In particular, it is an aim of the invention to provide an image compression technique with which horizontal and vertical graphical lines can be decompressed with high quality.

It is another aim of the invention to provide an image compression technique in which no document-specific parameter needs to be set for a particular type of document.

It is a further aim of the invention to provide an image binarization technique which is less time consuming and more memory efficient.

It is a further aim of the invention to provide an image binarization technique with improved edge detection.

It is a further aim of the invention to provide a symbol comparison technique which generates the minimum number of model classes, substantially without substitution errors.

These and other aims are achieved according to the invention with the methods and computer program products showing the technical characteristics of the claims.

In a first aspect of the invention, a method is proposed for creating a binary mask image from an inputted digital image of a scanned document. The method comprises the steps of: (a) creating a binarized image by binarizing said inputted digital image, (b) detecting in said binarized image first text regions representing light text on a dark background in said inputted digital image, and (c) inverting said first text regions in said binarized image, such that the inverted first text regions are interpretable in the same way as dark text on a light background. By means of these steps, inverted text (light text on a dark background) is detectable in a more efficient way with respect to the prior art, in particular at a higher speed and requiring less memory. By the inversion, the inverse text becomes interpretable in the same way as normal text (dark text on a light background), so no special steps or algorithms are needed to detect the inverse text and place it in the binary mask.

The method of the first aspect of the invention can for example be applied in image compression techniques using the MRC model. In such techniques, recording the inverse text in the same way as normal text has the advantage that the inverse text can be put in the foreground and not in the background. As a result, the inverse text can be compressed by a symbol-based compression technique which can lead to a higher compression rate. Furthermore, the legibility of the inverse text in the reconstructed image can be enhanced, since it is reconstructed on the basis of the foreground and background images and not only the background image, which usually has a low resolution and is compressed with a low quality.

The method of the first aspect of the invention can for example be applied in text recognition techniques. In such techniques, recording the inverse text in the same way as normal text has the advantage that the inverse text can be recognized along with normal text and is afterwards also text searchable.

In preferred embodiments, the method of the first aspect of the invention further comprises one or more of the following steps: (d) detecting in said binarized image second text regions representing dark text on a light background in said inputted digital image, and (e) eliminating from the binarized image text regions that represent no actual text but for example picture elements coming from picture parts in the inputted image.

The creation of the binarized image by binarizing the inputted digital image preferably comprises the following steps: (a1) building a grayscale image from said inputted digital image, (a2) detecting edges in said grayscale image, thereby building an edge binary image containing edge pixels and non-edge pixels, (a3) determining threshold values for each of said edge pixels on the basis of surrounding pixels and giving said non-edge pixels a null threshold value, thereby building a threshold grayscale image, (a4) determining threshold values for each of said non-edge pixels touching the edge pixels on the basis of surrounding threshold values, (a5) scaling said threshold grayscale image by keeping the maximum threshold values, (a6) propagating the threshold values from pixels having a positive value to pixels having a null value, and (a7) building a first binary image on the basis of said grayscale image and said scaled threshold grayscale image. These steps have the advantage that the threshold which is used for building the first binary image varies in order to detect more elements with various brightnesses and contrasts in the inputted digital image. In an MRC model compression technique, this can enhance the quality of the reconstructed image after decompression.

The step (a2) of detecting edges of text symbols in said image preferably comprises the use of a canny edge algorithm for said edge detection of text symbols. A canny edge algorithm uses a multiple stage algorithm to detect a wide range of edges and is for example known from J. Canny, "A Computational Approach to Edge Detection", IEEE Transactions on Pattern Analysis and Machine Intelligence, Vol 8, No. 6, November 1986, which is herein incorporated by reference in its entirety. The use of this algorithm can lead to a substantial improvement in the detection and/or recognition of text symbols in an image.

More preferably, the creation of the binary image further comprises the following steps: (a8) building a second binary image on the basis of said grayscale image and said threshold grayscale image, and (a9) building said binarized image by combining said first and second binary images. These steps have the advantage that the threshold which is used for building the second binary image varies further in order to detect even more elements with various brightnesses and contrasts in the inputted digital image. In an MRC model compression technique, this can enhance the quality of the reconstructed image after decompression.

In an embodiment, the creation of the binary mask image involves reducing the resolution of the inputted digital image by a binary mask resolution reduction factor. In this way, the binary mask resolution can for example be user-adjustable in an MRC model compression technique, depending on the desired quality of the reconstructed image.

In a second aspect of the invention which may or may not be combined with the other aspects of the invention, a method is proposed for comparing in a binary image a first pixel blob with a second pixel blob to determine whether they represent matching symbols, comprising the steps of: (f) dilating the first blob and checking if the second blob fits inside the dilated first blob, and (g) dilating the second blob and checking if the first blob fits inside the dilated second blob. The comparison method further comprises at least one of the following steps: (h) detecting a line in one of the first and second blobs not present in the other, (i) determining if one of the first and second blobs represents an italicized symbol where the other does not. Steps (h) and (i) can effectively reduce the number of erroneous symbol matches or, in other words, reduce the risk that mismatching symbols would be detected as matching symbols.

Preferably in the method according to the second aspect of the invention, step (h) comprises checking for N×N crosses in which one line in one of the blobs has a different color from that of one line in the other blob, wherein N is a number of bits, preferably 3.

Preferably in the method according to the second aspect of the invention, step (i) comprises checking if the number of black pixels which the first and second blobs have in common is above a predetermined threshold. This predetermined threshold preferably equals 80-90%, more preferably about 85% of the total amount of pixels in a blob, but other thresholds may also be used if deemed suitable by the person skilled in the art.

All above mentioned aspects of the invention may be part of a further aspect of the invention, namely a compression method for compressing said inputted digital image of said scanned document, said compression method comprising the steps of: (j) segmenting said inputted digital image into multiple image layers comprising a foreground image containing color information for foreground elements of said document, a background image containing color information for background elements of said document and said binary mask image for selecting between pixels in said foreground image and said background image upon decompressing said compressed digital image, and (k) compressing each of the image layers by means of a suitable compression technique, thereby obtaining a compressed digital image.

Preferably in this further aspect, the creation of said binary mask image involves reducing the resolution of the inputted digital image by a binary mask resolution reduction factor. The binary mask resolution can for example be user-adjustable, depending on the desired quality of the reconstructed image.

Preferably in this further aspect, the foreground and background images are built by reducing the resolution by respectively a foreground resolution reduction factor and a background resolution reduction factor. The foreground and background resolutions can for example be user-adjustable, depending on the desired quality of the reconstructed image.

Preferably in this further aspect, the compression comprises the steps of (k1) compressing said foreground and background images by means of an image compression technique, such as for example JPEG 2000 or any other known to the skilled person, and (k2) compressing said binary mask image by means of a symbol-based compression technique.

BRIEF DESCRIPTION OF THE DRAWINGS

The invention will be further elucidated by means of the following description and the appended figures.

Figure 13:
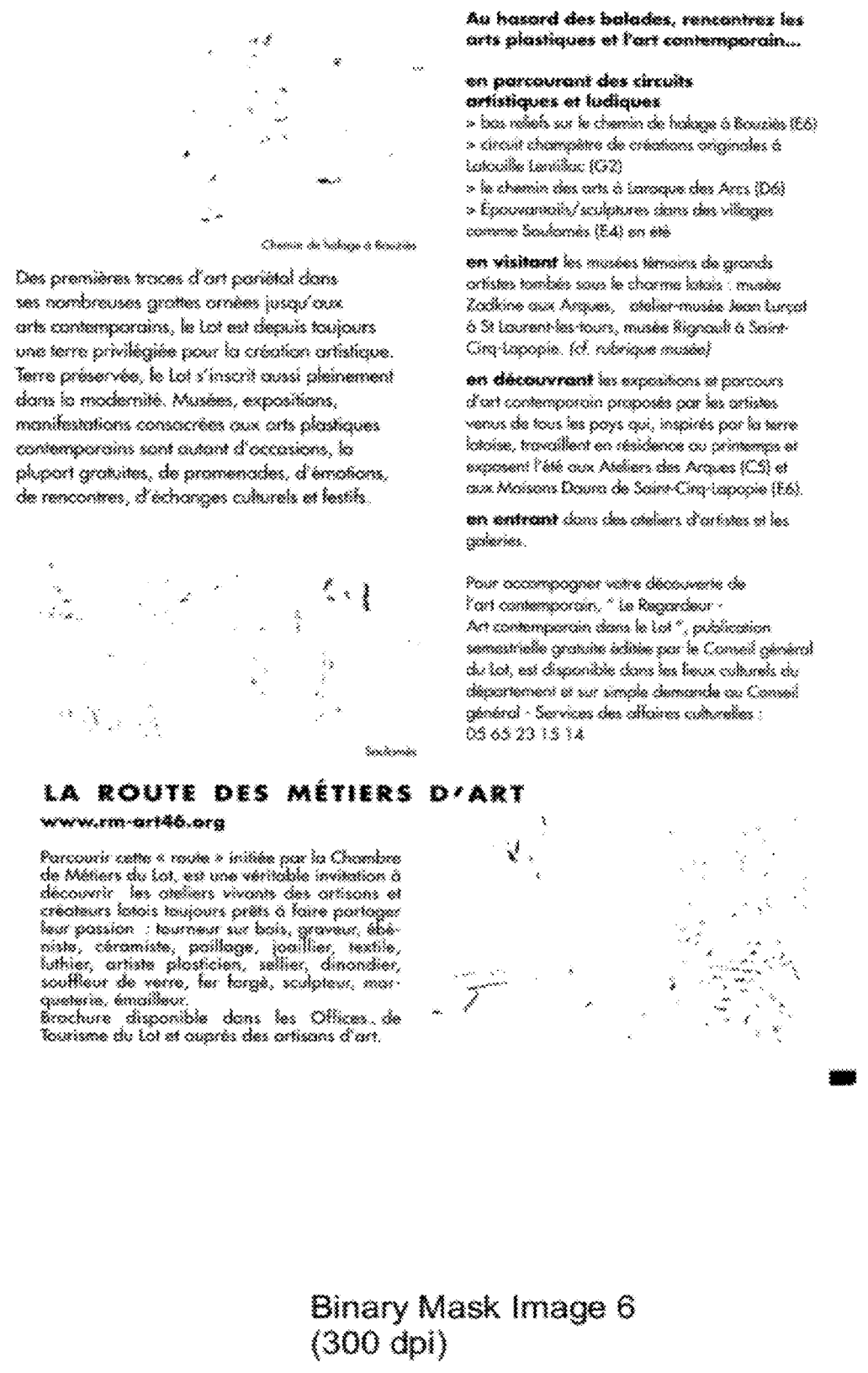

FIG. 13 shows a binary mask image built from the image of FIG. 11.

MODES FOR CARRYING OUT THE INVENTION

Figure 1:
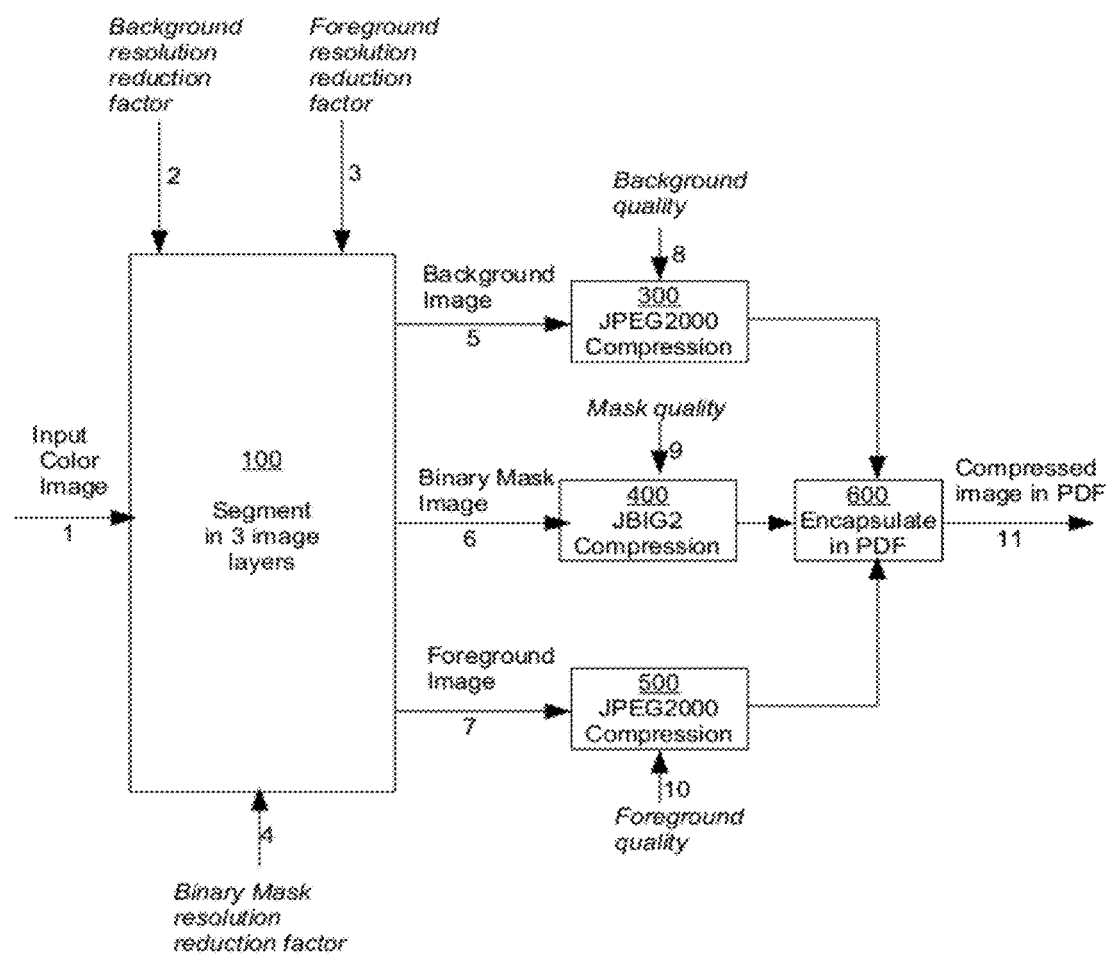
FIG. 1 shows a general flowchart of an MRC model compression algorithm according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

As used herein, a "color image" is intended to mean or a color raster image, i.e. a pixel map with each pixel representing a color value.

As used herein, a "grayscale image" is intended to mean a pixel map with each pixel representing an intensity value.

As used herein, a "binary image" or a "binarized image" is intended to mean a bitonal image, for example a black&white image, i.e. a pixel map with each pixel representing a binary value (ON or OFF, 1 or 0, black or white).

As used herein, "binarization" is intended to refer to an operation that transforms a color or grayscale image into a binary image.

As used herein, an "AND" operation of 2 binary images is intended to refer to an operation that makes the logical AND of the corresponding pixels in the 2 source images and puts the result in the destination image.

As used herein, an "OR" operation of 2 binary images is intended to refer to an operation that makes the logical OR of the corresponding pixels in the 2 source images and puts the result in the destination image.

As used herein, an "XOR" operation of 2 binary images is intended to refer to an operation that makes the logical XOR of the corresponding pixels in the 2 source images and puts the result in the destination image.

As used herein, an "inversion" of a binary image is intended to refer to an operation that inverts each pixel of the source image and puts the result in the destination image.

As used herein, "dilation" of a binary image is intended to refer to an operation that for each black pixel adds an N×N black pattern on the destination image with the pattern centered at the corresponding location in the destination image. For example, dilation by a 3×3 black pattern means an operation that for each black pixel adds a 3×3 black pattern on the destination image.

As used herein, "dilation" of a grayscale image is intended to refer to an operation that for each pixel searches for the value of the darkest pixel in an N×N (e.g. 3×3) square centered on this pixel and puts this value on the corresponding pixel of the destination image.

As used herein, a "blob" in a binary image is intended to refer to a group of connected black or white pixels.

In the following, aspects of the invention will be described using the example of an image compression method. Note that many of the described algorithms may also be applied in other methods, for example for text recognition or other. Furthermore, many modifications may be made to the described steps and algorithms without departing from the scope of the invention.

The compression method shown in FIG. 1 is based on the MRC model in which the inputted color or grayscale image is segmented in three layers after which each layer is compressed separately by means of a suitable compression technique. In particular, an inputted color image 1 is segmented into a background image 5, a binary mask image 6 and a foreground image 7 by means of a segmentation algorithm 100 which takes as parameters a background resolution reduction factor 2, a foreground resolution reduction factor 3 and a binary mask resolution reduction factor 4. The mask image 6 is a binary image, the background and foreground images 5, 7 are color or grayscale images (depending on whether the inputted image 1 is color or grayscale). An ON pixel in the binary mask image 6 indicates that, when decompressing, the color (or grayscale) has to be taken from the foreground image 7. An OFF pixel in the binary mask image 6 indicates that, when decompressing, the color (or grayscale) has to be taken from the background image 5. Subsequently, the background image 5 is compressed by means of an image compression technique 300 (such as for example JPEG 2000) which takes as parameter a background quality 8, the binary mask image 6 is compressed by a symbol-based compression technique (such as for example JBIG2) which takes as parameter a mask quality 9 and the foreground image 7 is compressed by means of an image compression technique 500 (such as for example JPEG 2000) which takes as input a foreground quality 10. Finally, the compressed images are encapsulated in a document readable format such as for example PDF, yielding a compressed image 11.

Figure 2:
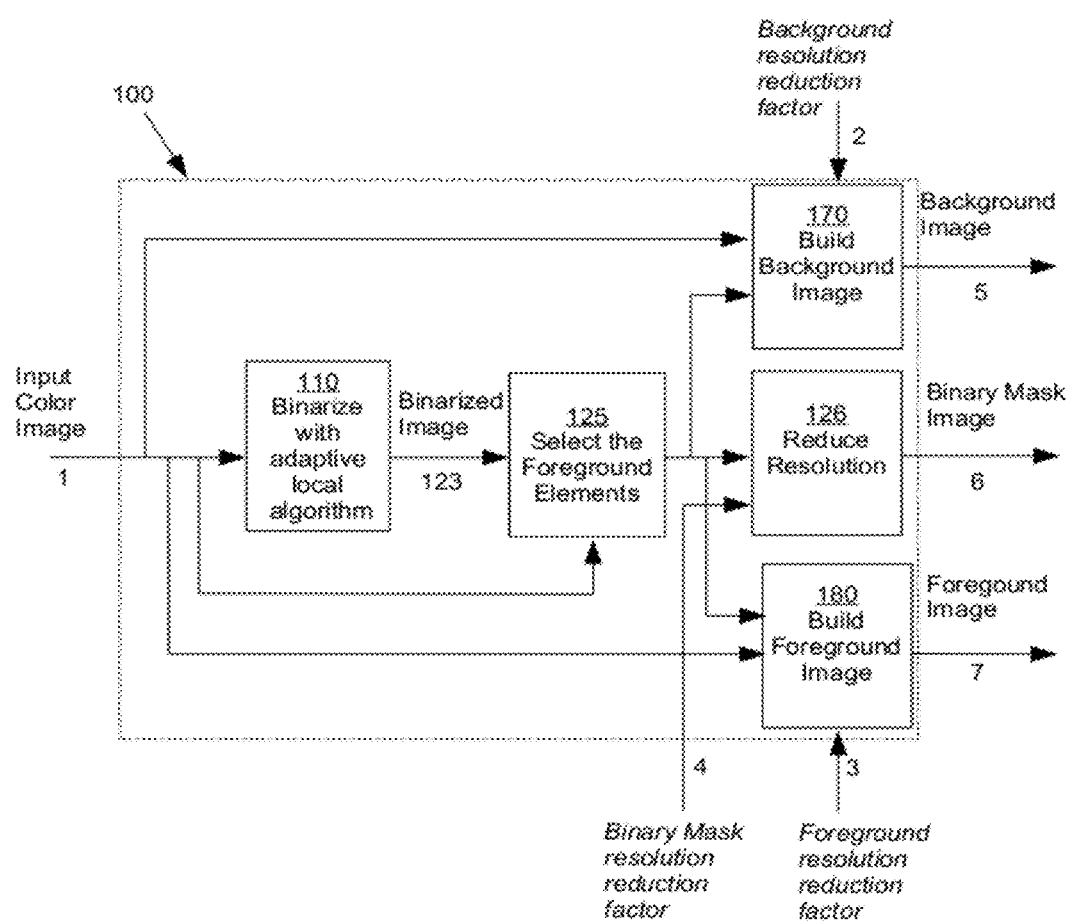
FIG. 2 shows a detailed flowchart of the segmentation step in the flowchart of FIG. 1.

The segmentation algorithm 100 is detailed by means of FIGS. 2-8, which show its steps and sub-algorithms. In general, as shown in FIG. 2, the segmentation comprises the following steps. The inputted image 1 is binarized with an adaptive local algorithm 110, which results in a binarized image 123 from which the foreground elements are selected in step 125 to build a binary mask image 6. This binary mask image 6 is used to build, on the basis of the inputted image 1, the background image 5 in step 170 and the foreground image 7 in step 180. Steps 170 and 180 respectively take into account the background resolution reduction factor 2 and the foreground resolution reduction factor 3. Step 126 is an optional step to reduce the resolution of the binary mask image 6 on the basis of the binary mask resolution reduction factor 4.

Figure 3:
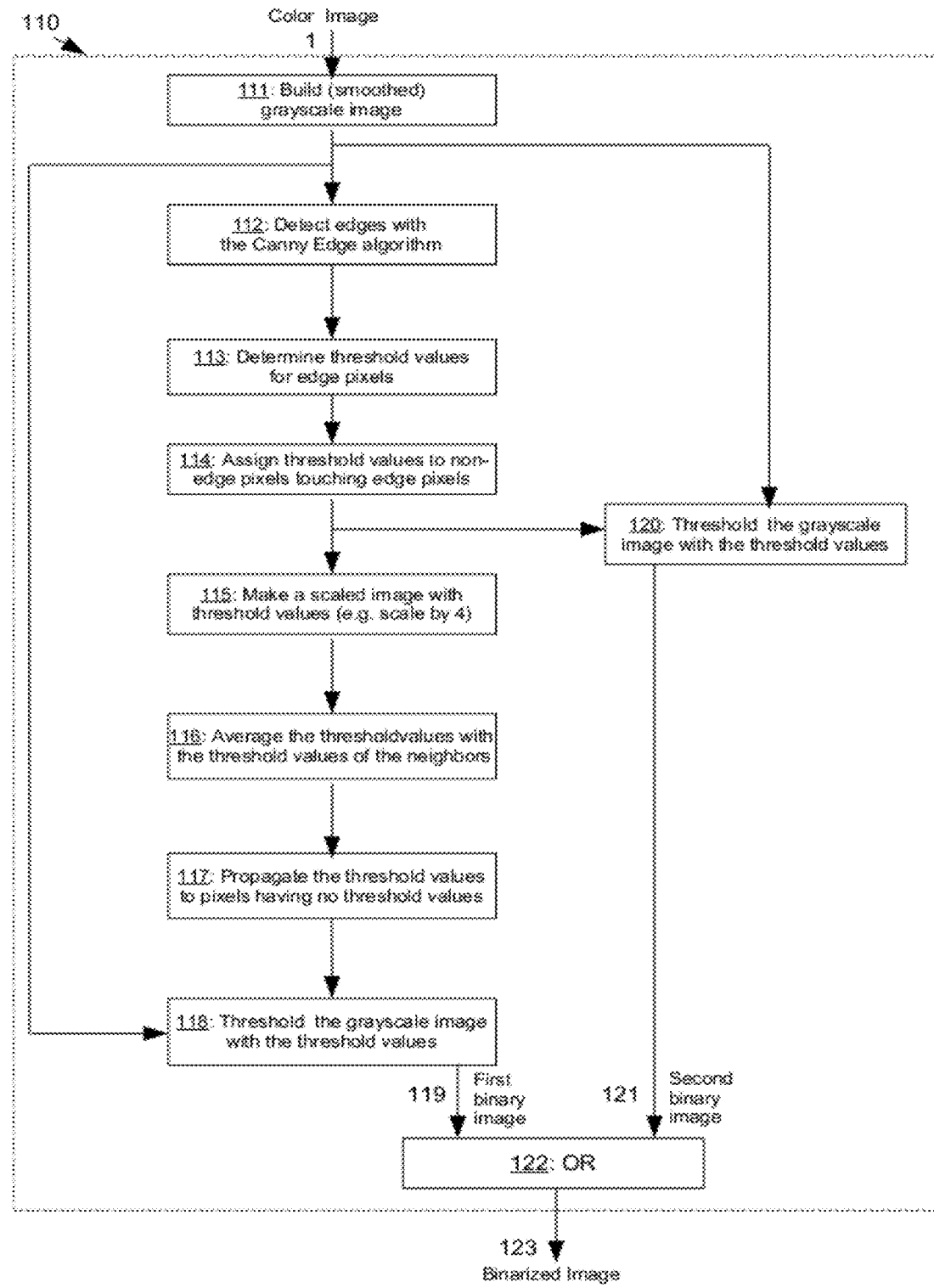
FIG. 3 shows a detailed flowchart of the binarization step in the flowchart of FIG. 2.

As shown in FIG. 3, the binarization of the inputted image 1 comprises an adaptive local algorithm 110 with the following steps. In step 111, the inputted image 1 (if in color) is transformed into a grayscale image by calculating the pixels intensities. This grayscale image may be smoothed (e.g. by a Gaussian filter) in order to reduce the noises.

Next, in step 112, edges are detected in the grayscale image by means of the Canny Edge detection algorithm. This was developed by John F. Canny in 1986 and uses a multiple stage algorithm to detect a wide range of edges, and is for example described in J. Canny, "A Computational Approach to Edge Detection", IEEE Transactions on Pattern Analysis and Machine Intelligence, Vol 8, No. 6, November 1986, which is herein incorporated by reference in its entirety. The algorithm uses two thresholds "Thigh" and "Tlow" in order to avoid breaking up an edge contour. An edge contour starts with a pixel whose gradient is greater than Thigh but can continue even for pixels whose gradient is lower than Thigh but greater than Tlow. According to the invention, typical values for Tlow and Thigh are respectively 32 and 40 for a 1-byte grayscale image. The canny edge detection algorithm is used to detect the edges of the text and graphic elements in the grayscale image. By doing so, also edges in pictures are detected, but this is not a problem since the picture elements can be filtered afterwards (step 160, see below). The canny edge detector produces a binary image in which only the edge pixels are set to 1.

With respect to other edge detection algorithms, the Canny edge detection algorithm offers the following advantages:
  good detection: the algorithm marks as many real edges in the image as possible;
  good localization: edges marked are as close as possible to the edge in the real image;
  minimal response: a given edge in the image is only marked once, and where possible, image noise does not create false edges.

Next in step 113, a threshold value is calculated for each edge pixel of the edge binary image output by the Canny edge algorithm 112. The threshold is to half the sum of a minimum and maximum value. The minimum value is the minimum value of a 3×3 square centered on the examined pixel. The maximum value is the maximum value of a 3×3 square centered on the examined pixel. Non-edge pixels receive a threshold value of 0.

Next in step 114, threshold values are assigned to non-edge pixels touching edge pixels. The threshold values are copied from the input to the output. For non-edge pixels (value=0), A 3×3 square is centered on each pixel. The sum of the threshold values for the pixels in this square is calculated and divided by the number of edge pixels if there are any. This value is copied on the output image. The output of step 114 is a threshold grayscale image.

Next in step 115, this threshold grayscale image is scaled by an integer factor, preferably 4. The output image is initialized at 0. For each output pixel, the values of the corresponding input pixels are added and divided by the number of non-zero values if there are any.

Next in step 116, the thresholds are averaged with the values of the neighbors. A 3×3 square is centered on each pixel for which the value is different from 0. The sum of the threshold values for the pixels in this square is calculated and divided by the number of non-zero values if there are any. This value is copied on the output image.

Next in step 117, the threshold values are propagated to pixels having no threshold values. Firstly, threshold values are assigned to non-zero value pixels touching zero value pixels in about the same way as in step 114. Secondly, a 2 pass propagation algorithm is used. In a 1st pass the image is scanned from left to right and from top to bottom. For zero value pixels, the value is put to that of the neighbor pixel with the smallest non-zero value. In a 2nd pass, the image is scanned from right to left and from bottom to top. Again, for zero value pixels, the value is put to that of the neighbor pixel with the smallest non-zero value. In this way all pixels receive a threshold value.

Next in step 118 a first binary image 119 is built by combination of the grayscale image output from step 111 and the threshold scaled grayscale image output from step 117. The value of each pixel of the grayscale image is compared to the threshold value of the corresponding pixel in the scaled threshold image. A value of 1 or 0 is set in the first binary image 119 depending on whether the pixel value is below or above the threshold.

In step 120 a second binary image 121 is built by combination of the grayscale image output from step 111 and the threshold grayscale image output from step 114. The value of each pixel of the grayscale image is compared to the threshold value of the corresponding pixel in the threshold image. A value of 1 or 0 is set in the second binary image 121 depending on whether the pixel value is below or above the threshold.

Finally in step 122 of the binarization algorithm 110 an OR is made of the first binary image 119 and the second binary image 121 to generate the binarized image 123.

Figure 4:
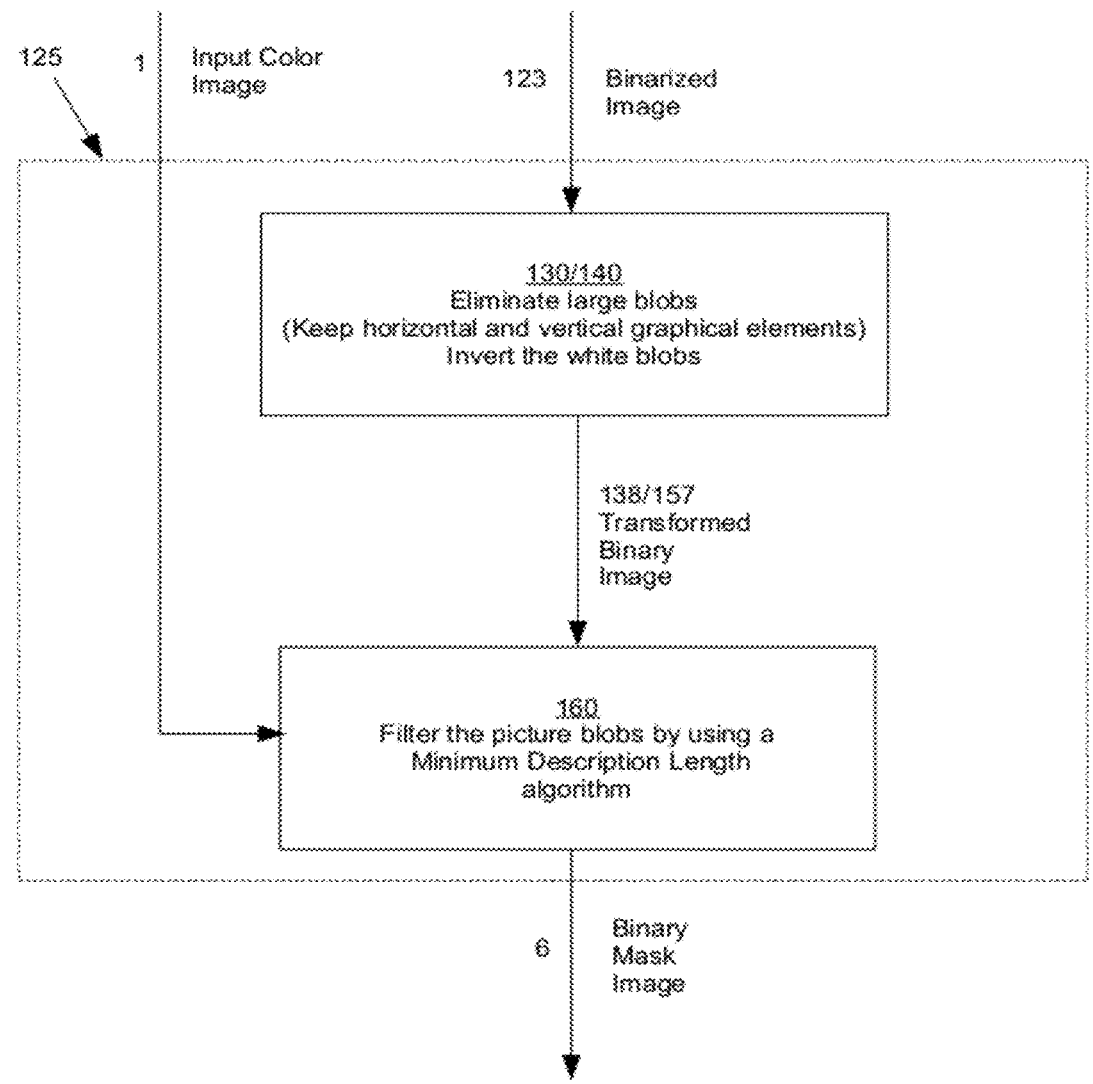
FIG. 4 shows a detailed flowchart of the foreground elements selection step in the flowchart of FIG. 2.

The binarized image 123 contains in addition to text and graphic elements, elements coming from picture parts in the inputted image 1. It is preferred that those elements are eliminated, so that they do not occur in the binary mask image 6. Furthermore, text elements in white on black are inverted to achieve that they become interpretable in the same way as black on white text, which is very advantageous in the further treatment of the binary mask image 6. These steps are carried out by a selection algorithm 125, which is shown in FIG. 4.

By means of the sub-algorithms 130 or 140, large blobs are eliminated from the binarized image 123 and the white blobs are inverted. The difference between the two is that in sub-algorithm 140 steps are added for keeping horizontal and vertical graphical elements, Sub-algorithm 130, shown in FIG. 5, comprises the following steps. In step 131, only large black blobs are kept, i.e. blobs with a number of pixels above a given minimum. Next, the image with those kept blobs is inverted in step 132. In step 133 a logical AND is made of this inverted image and the binarized image. These steps are repeated for the image output of step 132: again only large black blobs are kept in step 134, the image with those kept blobs is inverted in step 135 and an AND is made in step 136 with the image output of step 132. Finally, an XOR is made in step 137 of the image outputs of steps 133 and 136, resulting in a transformed binary image 138.

Figure 6:
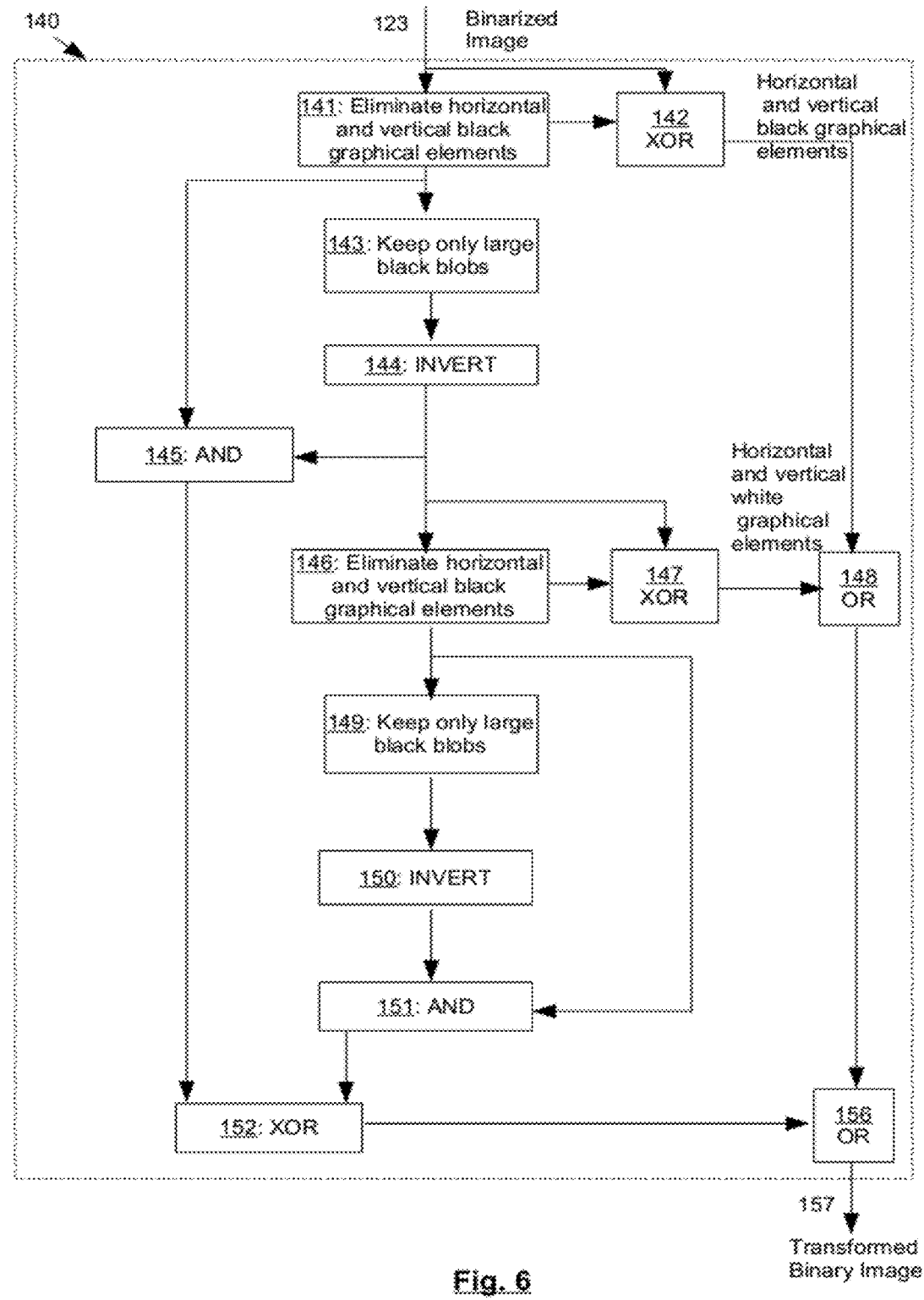
FIG. 6 shows a variation of the flowchart of FIG. 5 in which in addition horizontal and vertical graphical elements are kept.

Sub-algorithm 140, shown in FIG. 6, comprises the following steps. By means of elimination step 141 and XOR step 142 horizontal and vertical graphical elements are separated from the binarized image 123. Steps 143-145 correspond to steps 131-133 of the sub-algorithm 130. By means of elimination step 146 and XOR step 147, further horizontal and vertical graphical elements are separated from the image output of step 144. These separated graphical elements are combined in step 148 by making an OR of the outputs of XOR steps 142 and 147. Steps 149-151 correspond to steps 134-136 of the sub-algorithm 130. Again, an XOR is made in step 152 of the image outputs of the AND steps 145 and 151. Finally, a transformed binary image 157 is generated in step 156 by making an OR of the outputs of XOR steps 152 and OR step 148, putting the horizontal and vertical graphical elements back into the image.

The above mentioned steps for inverting the white on black text elements have the advantage that it is not needed to store the descriptions (bitmaps or list of runs) of all the blobs of the document. This is needed by prior art methods, especially in order to invert white on black blobs by seeking for holes (blobs enclosed in other blobs). In algorithms 130 and 140 the blobs are processed as soon as they are found and after a blob has been processed, its description is eliminated.

Returning to FIG. 4, the binary mask image 6 is generated from the transformed binary image 138/157 by eliminating picture blobs (i.e. blobs relating to no actual text elements). This is achieved by a filtering step 160 which uses the Minimum Description Length Principle, which is known in the art. Here is decided for each blob whether it is a foreground or a background element. In applying the Minimum Description Length principle, the strategy is to know whether the blob would be better compressed as being the foreground or as being part of the background. If the blob is in the background, it would be compressed in the background image. If the blob is in the foreground, it would be compressed in the binary mask image and in the foreground image. So, the cost of the different compressions must be estimated. The estimation is done by using simple models. The background model assumes that the color changes smoothly. The color of a pixel is not very different from its neighbors. The cost is the sum of the errors between the pixel colors and the local average color. The foreground model assumes that all the pixels of a blob have the same color. This is normally the case for text elements. The cost is the sum of the errors between the pixel colors and the average color. The binary mask model assumes that compression cost depends of the perimeter of the blob. So, a blob is part of the background (and filtered) if:

$$\text{cost background} < \text{cost foreground} + \text{perimeter} * \text{factor}$$

The factor is the only parameter and is tuned by testing a lot of pages. Here again, the blobs are processed as soon as they are found. After a blob has been processed, its description is eliminated.

Figure 7:
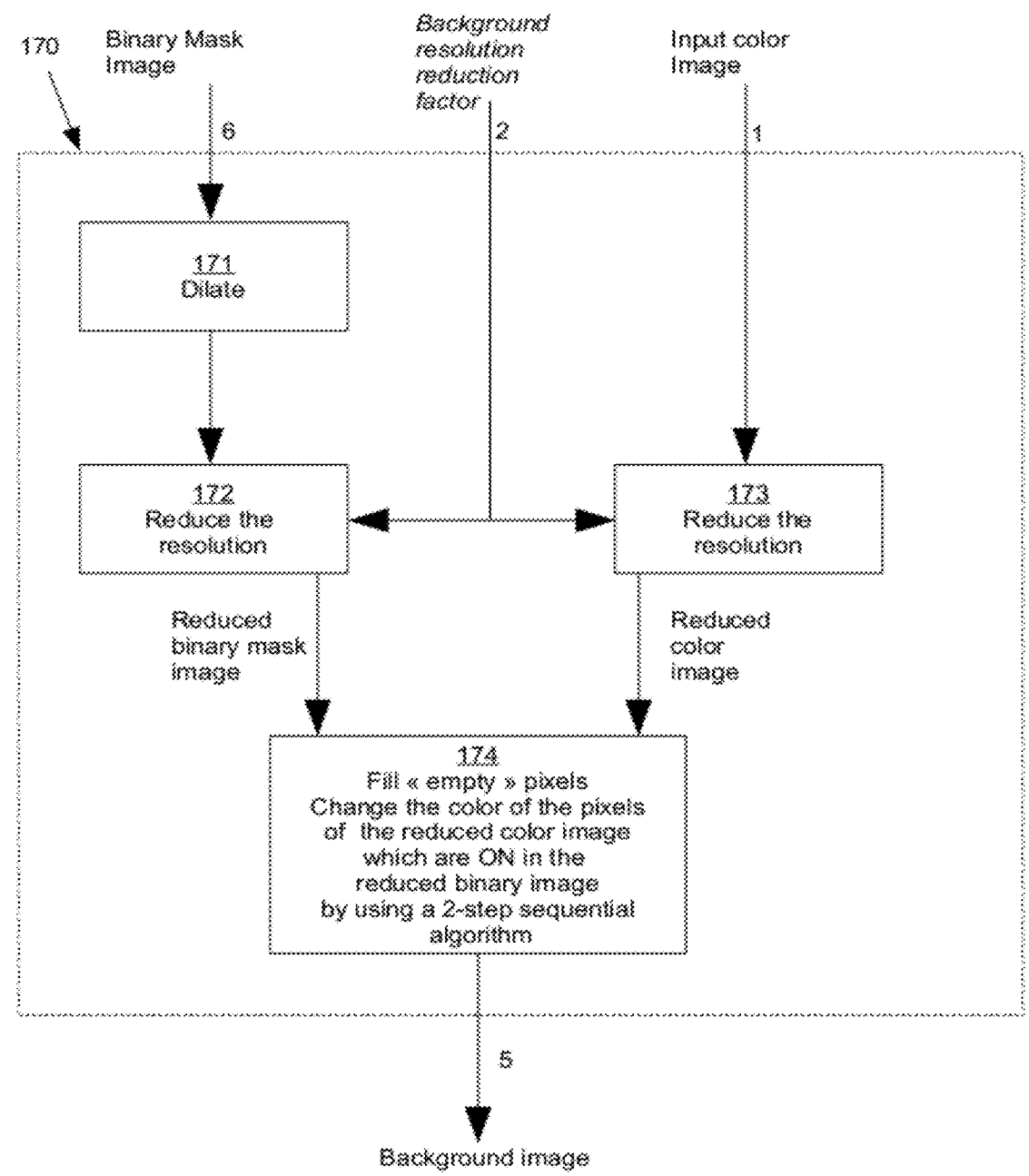
FIG. 7 shows a detailed flowchart of the background image building step in the flowchart of FIG. 2.

As shown in FIG. 7, the background image 5 is generated by means of an algorithm 170 which takes as inputs the inputted image 1, the binary mask image 6 and the background resolution reduction factor 2, which may be a user-definable parameter. In step 171, the binary mask image is dilated. In step 172, the resolution is reduced by the background resolution reduction factor 2. Likewise in step 173 the resolution of the inputted image 1 is reduced by the background resolution reduction factor 2. The resulting images are combined in step 174 to fill "empty" pixels. The color of the pixels of the reduced inputted image which are ON in the reduced binary mask image is changed by using a 2-step sequential algorithm. In a $1^{st}$ pass the 2 images are scanned from left to right and from top to bottom. When a "empty" pixel is encountered (OFF value in the reduced binary mask), a 3×3 square is centered on it in the reduced inputted image and the sum of the color values for the pixels in this square is calculated and divided by the number of non-empty pixels if there are any. This color value is assigned to the pixel in the reduced inputted image. In a $2^{nd}$ pass, the 2 images are scanned from right to left and from bottom to top. Again, when an "empty" pixel is encountered, a color value is assigned to it in the same way as in the $1^{st}$ pass.

Figure 8:
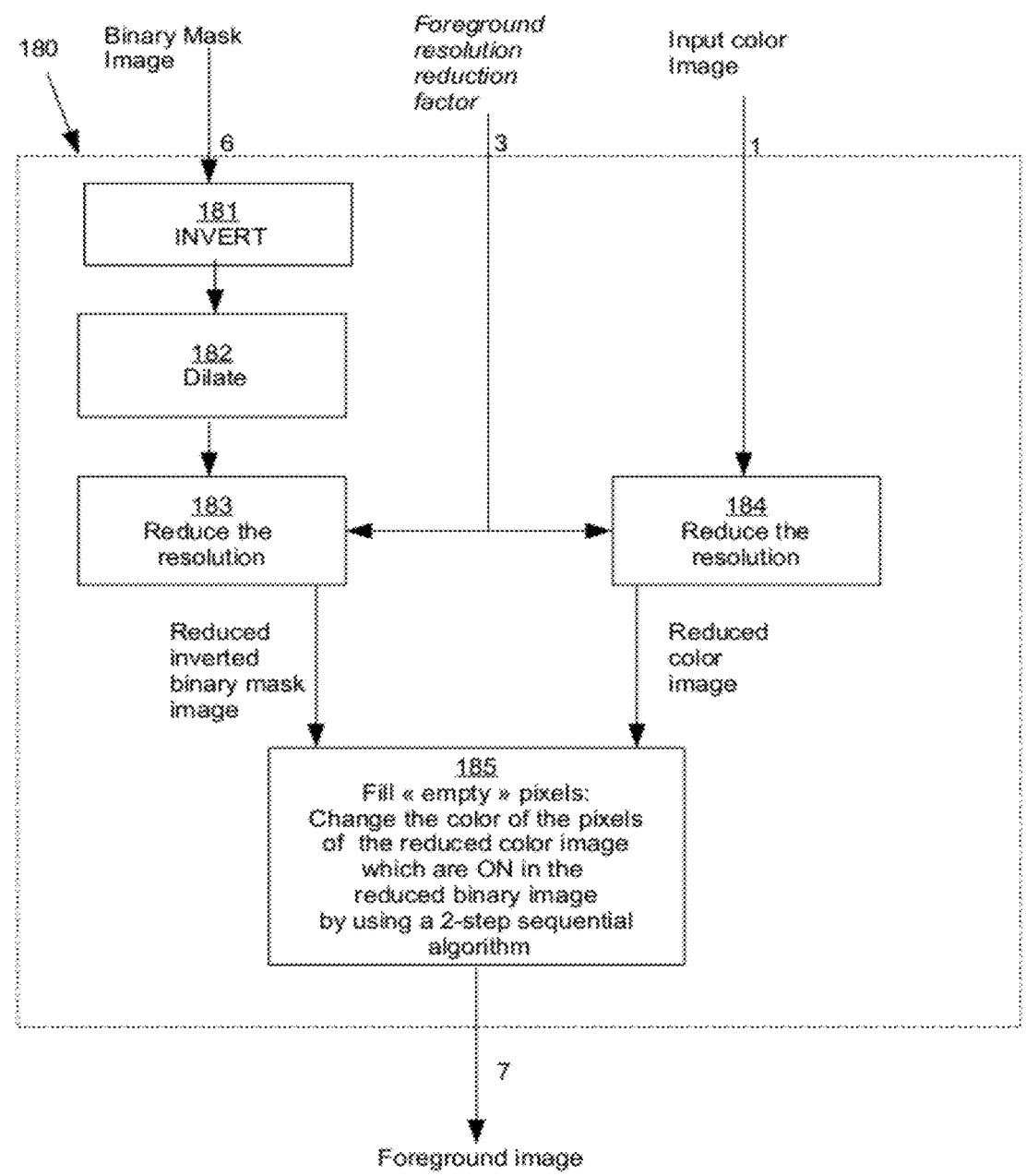
FIG. 8 shows a detailed flowchart of the foreground image building step in the flowchart of FIG. 2.

As shown in FIG. 8, the foreground image 7 is generated by means of an algorithm 180 which takes as inputs the inputted image 1, the binary mask image 6 and the foreground resolution reduction factor 3, which may be a user-definable parameter. In steps 181 and 182, the binary mask image is subsequently inverted and dilated. In step 183, the resolution is reduced by the foreground resolution reduction factor 2. Likewise in step 185 the resolution of the inputted image 1 is reduced by the foreground resolution reduction factor 2. The resulting images are combined in step 186 to fill "empty" pixels. The color of the pixels of the reduced inputted image which are ON in the reduced binary mask image is changed by using a 2-step sequential algorithm like in step 174.

Figure 11:
FIG. 11 shows an example of an inputted color image, compressible by means of the method of FIGS. 1-8.
Figure 12:
FIG. 12 shows the image of FIG. 11 after the binarization step.
Figure 12:
Figure 12:
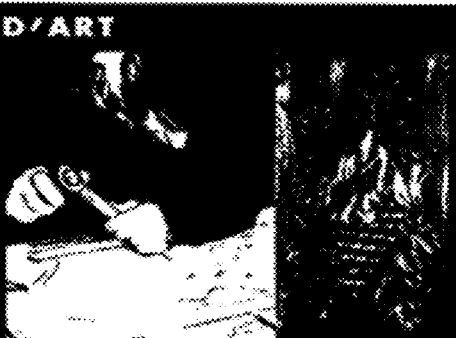
Figure 14:
FIG. 14 shows a background image built from the image of FIG. 11.
Figure 15:
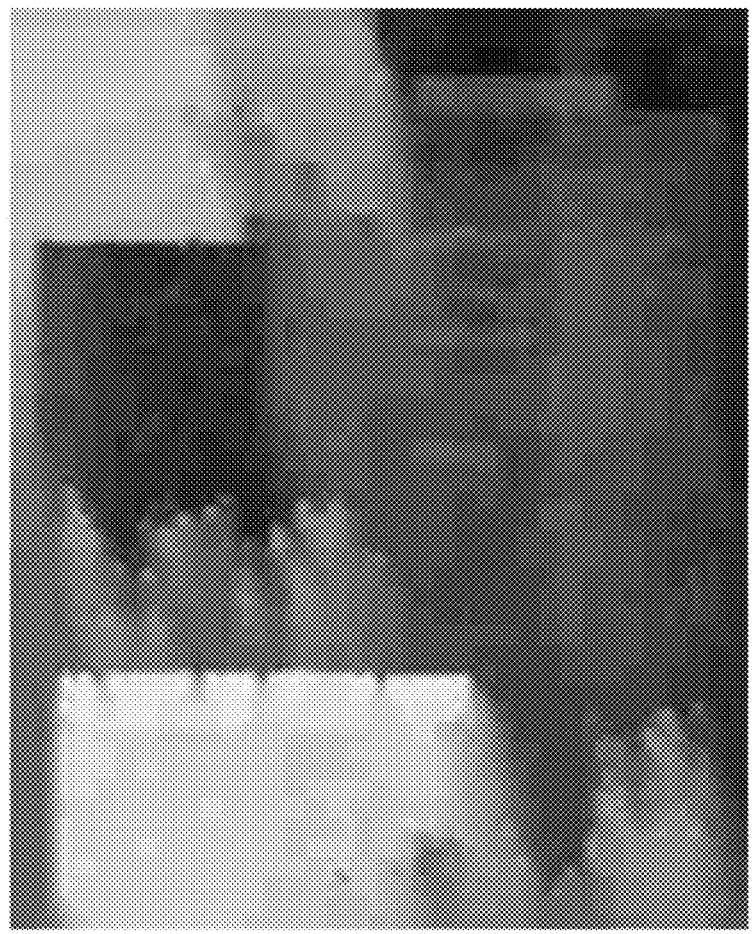
FIG. 15 shows a foreground image built from the image of FIG. 11.
Figure 16:
FIG. 16 shows a reconstructed image built by means of the images of FIGS. 13-15.

An example of an image compressed by means of the method of FIGS. 1-8 is shown in FIGS. 11-16. FIG. 11 shows an inputted color image 1 which is a scanned document at 300 dpi. FIG. 12 shows the binarized image 123 after the binarization 110 and FIG. 13 shows the binary mask image 6 after the selection of foreground elements 125. The binary mask image is also at 300 dpi, which means that in this case the binary mask resolution reduction factor is set to 1 (no reduction). FIG. 14 shows the background image 5 which is at 100 dpi, meaning that the background resolution reduction factor is set to 3. FIG. 15 shows the foreground image 7 which is at 50 dpi, meaning that the foreground resolution reduction factor is set to 6. FIG. 16 shows the reconstructed image 12 which is achieved after decompression of the compressed image 11. Since the binary mask image is at 300 dpi, the reconstructed image is also at 300 dpi, i.e. the same resolution as the inputted image 1. From a comparison of FIGS. 11 and 16 it is clear that a high quality of reconstructed images can be achieved with the compression method of FIGS. 1-8.

Figure 5:
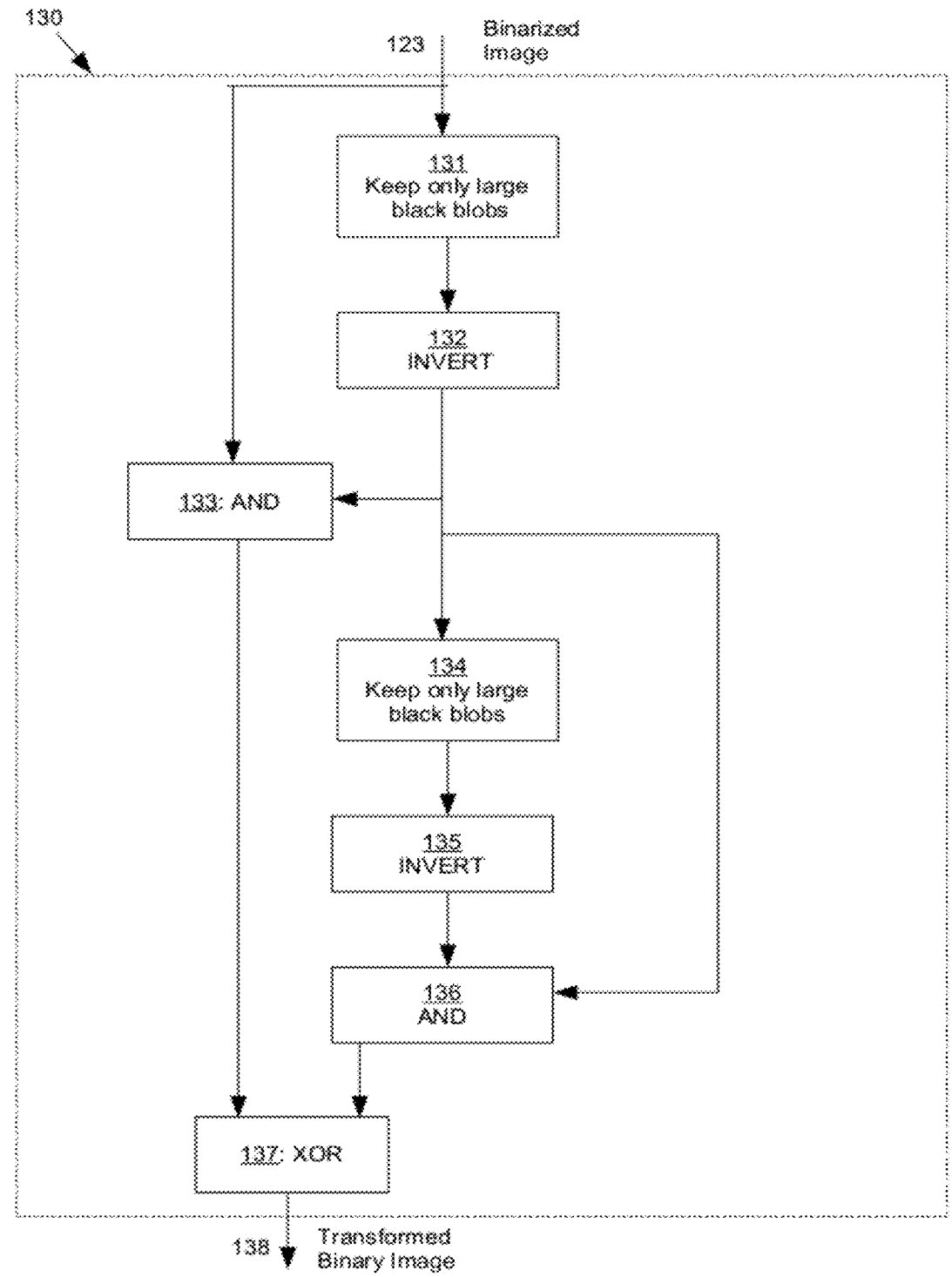
FIG. 5 shows a detailed flowchart of the large blob elimination and white blob inversion step in the flowchart of FIG. 4.
Figure 17:
FIGS. 17-21 show stepwise how the binary mask image of FIG. 13 is built from the binarized image of FIG. 12.
Figure 17:
Figure 18:
Figure 19:
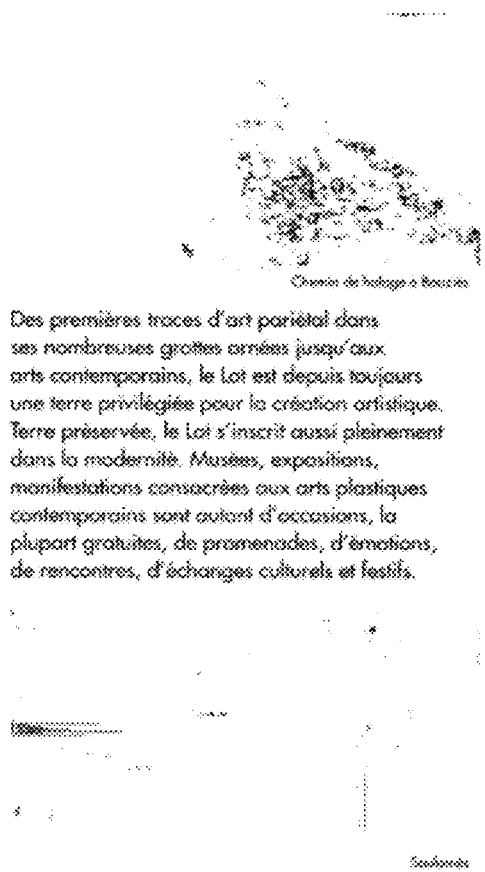
Figure 19:
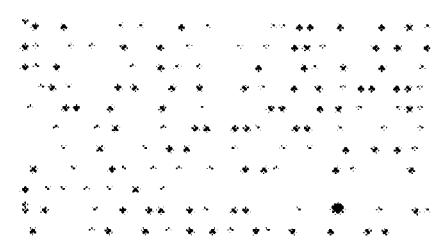
Figure 19:
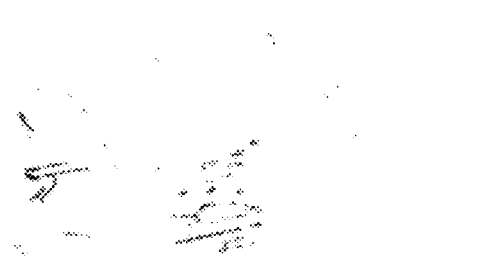
Figure 20:
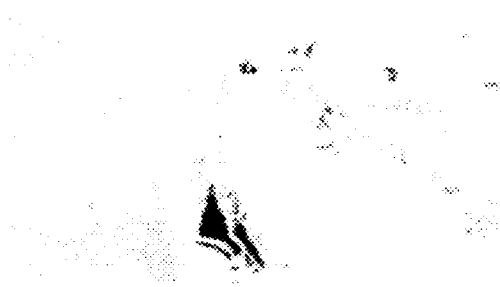
Figure 20:
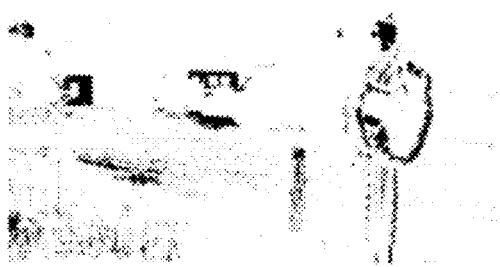
Figure 20:
Figure 20:
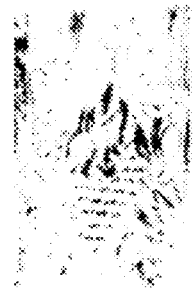
Figure 21:
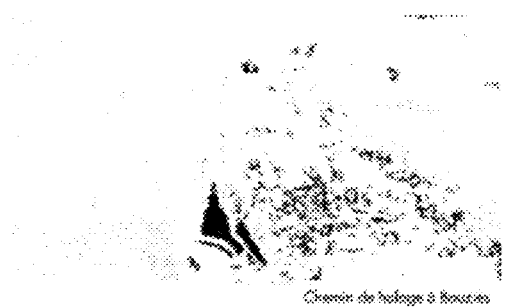
Figure 21:
Figure 21:

FIGS. 17-21 show how the binary mask image 6 is built from the binarized image 123 by the foreground elements selection process 125 (see FIGS. 4-6). FIG. 17 shows the binarized image 123 after separation of the vertical black line in the middle of the image, i.e. after step 141. FIG. 18 shows the binarized image 123 with only the large black blobs kept and after inversion, i.e. after steps 143 and 144. FIG. 19 shows the binarized image 123 without large black blobs, which is achieved by AND-ing the images of FIGS. 17 and 18 in step 145. FIG. 20 shows the result after steps 146-151, i.e. an inverted image without large black blobs. By XOR-ing these two images of FIGS. 19 and 20 in step 152, a transformed binary image 138/157 is achieved, which is the binarized image 123 in which large black blobs have been removed and white blobs have been inverted. This transformed image is shown in FIG. 21. It can be seen that text regions representing light text on a dark background or "inverted text" in the original image 1 is represented as black on white in the same way as dark text on a light background or "normal text" in the original image 1. The binary mask image 6 of FIG. 13 is built from the transformed image of FIG. 21 by filtering the picture blobs in step 160.

Figure 9:
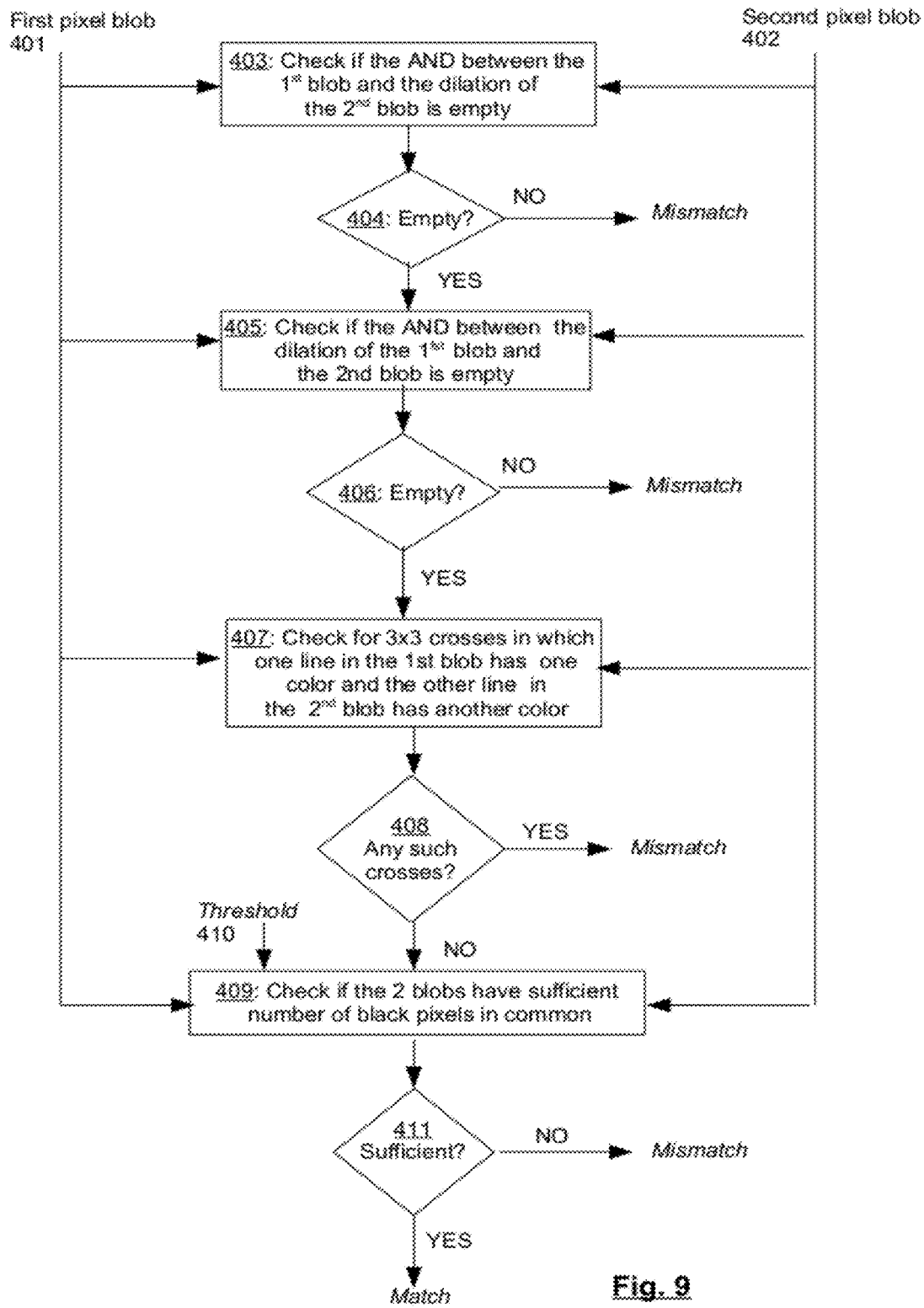
FIG. 9 shows a flowchart of a symbol comparison algorithm according to the invention.

FIG. 9 shows a symbol classification algorithm, in accordance with the second aspect of the invention, which may be part of the symbol-based compression algorithm 400 used for compressing the binary mask image 6. The symbol classification algorithm takes as input a binary image, such as for example the binary mask image 6, and outputs a list of symbols and a list of symbol occurrences. An item in the list of symbols includes a symbol ID and a symbol bitmap. An item in the list of occurrences includes the matching symbol ID and the position of the occurrence in the page.

The symbol classification algorithm comprises the following steps. In steps 403 and 404 it is determined whether a first pixel blob 401 fits within a dilation of a second pixel blob 402. If not, a "mismatch" is returned. If so, in steps 405 and 406 it is determined whether the second pixel blob 402 fits within a dilation of the first pixel blob 401. If not, a "mismatch" is returned. If so, it looks like a "match", but two further checks are made to avoid errors. In steps 407 and 408, it is determined if one of the blobs 401, 402 has a line not present in the other. More particularly, this involves checking for 3×3 crosses in which one line in one of the blobs has a different color from that of the other line in the other blob. In steps 409 and 411 it is determined if one of the blobs 401, 402 represents an italicized symbol where the other does not. More particularly, this involves checking if the number of black pixels which the first and second blobs 401, 402 have in common is above a predetermined threshold 410. This predetermined threshold preferably equals 80-90%, more preferably about 85% of the total amount of pixels in a blob.

Figure 10:
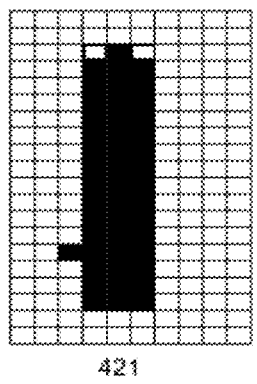
FIG. 10 shows a visualization of steps of the symbol comparison algorithm of FIG. 9.
Figure 10:
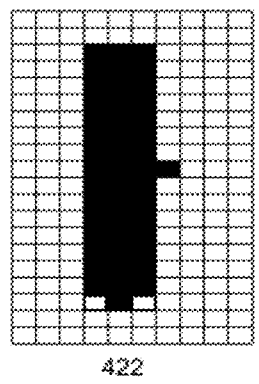
Figure 10:
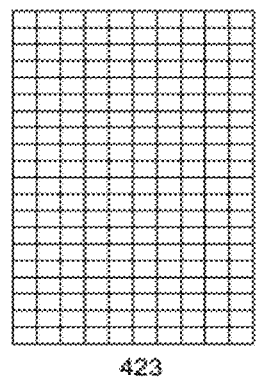
Figure 10:
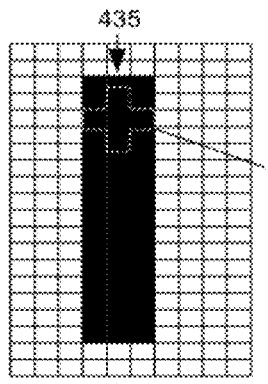
Figure 10:
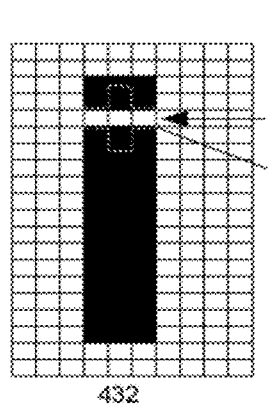
Figure 10:
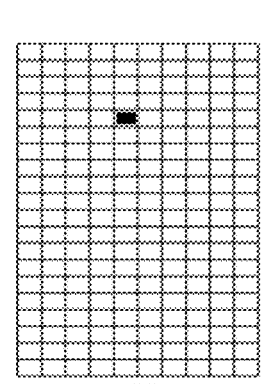
Figure 10:
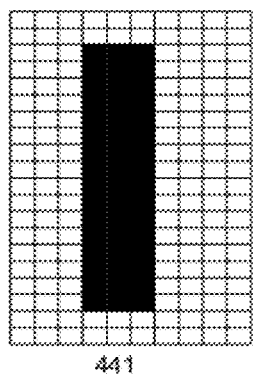
Figure 10:
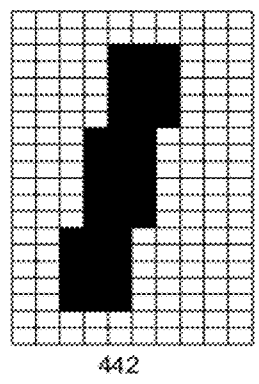
Figure 10:
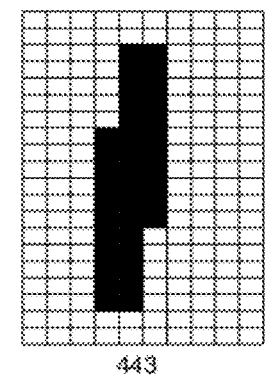

These steps are visualized in FIG. 10. The top row represents two pixel blobs 421 and 422 which fit into each other's dilations (steps 403-406), so the result 423 is a match. The middle row represents two pixel blobs 431 and 432 which also fit into each other's dilations (steps 403-406), but are clearly not a match. This kind of errors is eliminated by checking for 3×3 crosses 433, 434 in which one line in one of the blobs has a different color from that of the other line in the other blob (steps 407-408). In the cross 433 on the first blob 431 the vertical line 435 is black while the horizontal line 436 in the corresponding cross 434 on the second blob 432 is white, so the result 437 is a mismatch. The bottom row represents two pixel blobs 441 and 442 which also fit into each other's dilations (steps 403-406), but are clearly not a match either since blob 442 is a symbol in italics while blob 441 is not. This kind of errors is eliminated by AND-ing the blobs 441 and 442, the result of which is shown in 443 (the black pixels which are in common are black in result 443) and checking if the number of pixels in common is above threshold 410 (steps 409-411). In this example, the number of pixels in 443 would be below the threshold 410, so a mismatch is detected.

The invention claimed is:

1. A method for creating a binary mask image from an inputted digital image of a scanned document, comprising the steps of:
    a) creating a binarized image by binarizing said inputted digital image,
    b) detecting in said binarized image first text regions representing light text on a dark background in said inputted digital image,
    c) detecting in said binarized image second text regions representing dark text on a light background in said inputted digital image,
    d) inverting said first text regions in said binarized image, such that a transformed binary image is formed in which the inverted first text regions are interpretable in the same way as dark text on a light background,
    e) generating the binary mask image from the transformed binary image by eliminating picture blobs that relate to no actual text elements,
wherein the steps of detecting the first and second text regions and the step of inverting the first text regions are performed in a single pass over the binarized image on the basis of pixel blobs contained in the binarized image without analyzing if the first and second text regions represent text, wherein the pixel blobs are processed as soon as they are found and wherein descriptions of said pixel blobs that are being used for said processing are eliminated immediately after said processing.

2. The method according to claim 1, wherein the creation of said binary mask image further comprises the step of eliminating from the binarized image text regions that represent no actual text.

3. The method according to claim 2, further comprising the steps of separating off horizontal and vertical graphical elements before said steps of detecting first and second text regions, and reintroducing the said horizontal and vertical graphical elements into the binarized image after said detection steps.

4. The method according to claim 1, wherein step a) comprises the following steps:

a1) building a grayscale image from said inputted digital image,
a2) detecting edges in said grayscale image, thereby building an edge binary image containing edge pixels and non-edge pixels,
a3) determining threshold values for each of said edge pixels on the basis of surrounding pixels and giving said non-edge pixels a null threshold value, thereby building a threshold grayscale image,
a4) determining threshold values for each of said non-edge pixels touching the edge pixels on the basis of surrounding threshold values,
a5) scaling said threshold grayscale image by keeping the maximum threshold values,
a6) propagating the threshold values from pixels having a positive value to pixels having a null value,
a7) building a first binary image on the basis of said grayscale image and said scaled threshold grayscale image.

5. The method according to claim 4, wherein step a2) involves the use of a canny edge algorithm for said edge detection.

6. The method according to claim 4, wherein step a) further comprises the following steps:
a8) building a second binary image on the basis of said grayscale image and said threshold grayscale image,
a9) building said binarized image by combining said first and second binary images.

7. The method according to claim 1, wherein said inputted digital image has a given resolution and said creation of said binary mask image involves reducing said resolution by a binary mask resolution reduction factor.

8. A method for text recognition, comprising the steps of:
creating a binary image from an inputted digital image of a scanned document by means of the following steps:
a. creating a binarized image by binarizing said inputted digital image;
b. detecting in said binarized image first text regions representing light text on a dark background in said inputted digital image;
c. detecting in said binarized image second text regions representing dark text on a light background in said inputted digital image; and
d. inverting said first text regions in said binarized image, such that a transformed binary image is formed in which the inverted first text regions are interpretable in the same way as the second text regions;
wherein the steps of detecting the first and second text regions and the step of inverting the first text regions are performed on a single pass over the binarized image on the basis of pixel blobs contained in the binarized image without analyzing if the first text regions represent text, wherein the pixel blobs are processed as soon as they are found and wherein descriptions of said pixel blobs that are being used for said processing are eliminated immediately after said processing; and
applying a text recognition technique in which the inverted first text regions are recognized along with the second text regions.

9. A compression method for compressing an inputted digital image of a scanned document, said compression method comprising the steps of:
a) segmenting said inputted digital image into multiple image layers comprising a foreground image containing color information for foreground elements of said document, a background image containing color information for background elements of said document and a binary mask image for selecting between pixels in said foreground image and said background image upon decompressing said compressed digital image, and
b) compressing each of the image layers by means of a suitable compression technique, thereby obtaining a compressed digital image,
wherein creating the binary mask image involves the steps of:
creating a binarized image by binarizing said inputted digital image,
detecting in said binarized image first text regions representing light text on a dark background in said inputted digital image,
detecting in said binarized image second text regions representing dark text on a light background in said inputted digital image,
inverting said first text regions in said binarized image, such that a transformed binary image is formed in which the inverted first text regions are interpretable in the same way as dark text on a light background,
generating the binary mask image from the transformed binary image by eliminating picture blobs that relate to no actual text elements,
wherein the steps of detecting the first and second text regions and the step of inverting the first text regions are performed in a single pass over the binarized image on the basis of pixel blobs contained in the binarized image without analyzing if the first and second text regions represent text, wherein the pixel blobs are processed as soon as they are found and wherein descriptions of said pixel blobs that are being used for said processing are eliminated immediately after said processing.

10. The method according to claim 9, wherein said inputted digital image has a given resolution and said creation of said binary mask image involves reducing said resolution by a binary mask resolution reduction factor.

11. The method according to claim 9, wherein said inputted digital image has a given resolution and said foreground and background images are built by reducing said resolution by respectively a foreground resolution reduction factor and a background resolution reduction factor.

12. The method according to claim 9, wherein step b) comprises the steps of:
b1) compressing said foreground and background images by means of an image compression technique,
b2) compressing said binary mask image by means of a symbol-based compression technique.

13. A computer program product stored on a non-transitory computer-readable medium and directly loadable into a memory of a computer, comprising software code portions for performing the following steps when said product is run on a computer:
a) segmenting an inputted digital image of a scanned document into multiple image layers comprising a foreground image containing color information for foreground elements of said document, a background image containing color information for background elements of said document and a binary mask image for selecting between pixels in said foreground image and said background image upon decompressing said compressed digital image, and
b) compressing each of the image layers by means of a suitable compression technique, thereby obtaining a compressed digital image,
wherein creating the binary mask image involves the steps of:
creating a binarized image by binarizing said inputted digital image, detecting in said binarized image first text regions representing light text on a dark background in said inputted digital image, detecting in said binarized image second text regions representing dark text on a light background in said inputted digital image, inverting said first text regions in said binarized image, such that a transformed binary image is formed in which the inverted first text regions are interpretable in the same way as dark text on a light background, generating the binary mask image from the transformed binary image by eliminating picture blobs that relate to no actual text elements, wherein the steps of detecting the first and second text regions and the step of inverting the first text regions are performed in a single pass over the binarized image on the basis of pixel blobs contained in the binarized image without analyzing if the first and second text regions represent text, wherein the pixel blobs are processed as soon as they are found and wherein descriptions of said pixel blobs that are being used for said processing are eliminated immediately after said processing.

\* \* \* \* \*